United States Patent [19]

Markiewitz

[11] 4,296,215
[45] Oct. 20, 1981

[54] METHOD TO THICKEN DISSOLVED THERMOSET RESINS

[75] Inventor: Kenneth H. Markiewitz, Wilmington, Del.

[73] Assignee: ICI Americas Inc., Wilmington, Del.

[21] Appl. No.: 137,896

[22] Filed: Apr. 7, 1980

Related U.S. Application Data

[63] Continuation of Ser. No. 928,691, Jul. 27, 1978, abandoned.

[51] Int. Cl.$^3$ .................... C08L 75/06; C08L 67/06; C08L 63/02
[52] U.S. Cl. ........................................ 525/28; 525/11; 525/25; 525/440; 525/455; 525/528; 525/920; 525/922
[58] Field of Search ............... 260/836, 837, 859; 525/28, 440, 455, 528, 11, 25

[56] References Cited

U.S. PATENT DOCUMENTS

| | | | |
|---|---|---|---|
| 2,625,535 | 1/1953 | Mastin et al. | 260/75 |
| 2,780,613 | 2/1957 | Rubens | 260/45.4 |
| 2,861,981 | 11/1958 | Frank et al. | 260/75 |
| 2,943,072 | 6/1960 | Forsythe | 260/40 |
| 2,982,754 | 5/1961 | Sheffer et al. | 260/33.4 |
| 2,993,870 | 7/1961 | Burkus | 260/2.5 |
| 3,006,879 | 10/1961 | Parker | 260/75 |
| 3,007,894 | 11/1961 | Bunge et al. | 260/45.4 |
| 3,008,917 | 11/1961 | Park et al. | 260/45.4 |
| 3,084,141 | 4/1963 | Kuaus | 260/85.1 |
| 3,136,733 | 6/1964 | Ross | 260/40 |
| 3,165,514 | 1/1965 | D'Alelio | 260/248 |
| 3,252,942 | 5/1966 | France et al. | 528/49 |
| 3,304,286 | 2/1967 | Altscher et al. | 260/47 |
| 3,334,056 | 8/1967 | Fischer et al. | 260/2.5 |
| 3,371,056 | 2/1968 | Delius | 260/22 |
| 3,373,221 | 3/1968 | May | 260/837 |
| 3,433,771 | 3/1969 | Vasta | 260/77.5 |
| 3,454,533 | 7/1969 | Kerrigan | 260/75 |
| 3,457,326 | 7/1969 | Kienle | 260/858 |
| 3,505,427 | 4/1970 | Aggias | 260/830 |
| 3,582,508 | 6/1971 | McIntosh, Jr. | 260/23.7 |
| 3,595,941 | 7/1971 | Farrar et al. | 260/879 |
| 3,632,532 | 1/1972 | Gaeth | 260/2.5 R |
| 3,714,110 | 1/1973 | Verdol et al. | 260/33.6 AQ |
| 3,850,861 | 11/1974 | Fabris et al. | 260/2.5 BE |
| 3,856,830 | 12/1974 | Kuehil | 260/859 R |
| 3,876,518 | 4/1975 | Borden et al. | 204/159.14 |
| 3,876,726 | 5/1975 | Ford, Jr. et al. | 260/859 R |
| 3,878,077 | 4/1975 | Borden et al. | 204/159.16 |
| 3,917,666 | 11/1975 | Fabris et al. | 260/465.4 |
| 3,926,875 | 12/1975 | Tsugukuni et al. | 260/23 TN |
| 3,980,594 | 9/1976 | Fabris et al. | 260/2.5 |
| 4,042,558 | 8/1977 | von Bonin et al. | 260/87 N |
| 4,070,416 | 1/1978 | Narahara | 525/428 |
| 4,073,828 | 4/1978 | Ferrarini et al. | 260/859 R |
| 4,110,184 | 10/1978 | Dart et al. | 260/859 R |
| 4,125,491 | 5/1978 | Gorman | 260/859 R |
| 4,129,641 | 12/1978 | Ferrarini et al. | 260/859 R |
| 4,133,723 | 1/1978 | Howard | 260/859 R |
| 4,162,274 | 7/1979 | Rosenkranz | 525/528 |

FOREIGN PATENT DOCUMENTS

| | | |
|---|---|---|
| 778853 | 3/1954 | Canada . |
| 501126 | 2/1968 | Canada . |
| 1078225 | 8/1967 | United Kingdom . |

*Primary Examiner*—Paul Lieberman

[57] ABSTRACT

Dissolved or dispersed thermoset resins compositions which have a molecular weight of at least 500 may be thickened by the addition of a polyfunctional isocyanate and a trimerization catalyst. The thickened compositions can be cured by a free radical catalyst and the application of heat and/or pressure. A variety of reinforced articles can be produced from the thickened compositions.

28 Claims, No Drawings

METHOD TO THICKEN DISSOLVED THERMOSET RESINS

This is a continuation of application Ser. No. 928,691, filed July 27, 1978, now abandoned.

The present invention concerns a method of thickening thermoset resin materials, resulting in thickened compositions and articles produced therefrom. More particularly the thickening is achieved by the addition of a polyfunctional isocyanate, and trimerization catalyst to a solution of the thermoset resins.

Thickening thermoset resins by prior art processes frequently suffer due to lack of control in achieving the desired viscosity or take an unduly long time period to reach the desired viscosity or provide for the formation of products which when cured are deficient in a variety of properties including strength, corrosion resistance, heat stability, and heat distortion temperature among others. In general the prior art processes disclosing thickening techniques rely on the addition of magnesium oxide to unsaturated polyester resins blended with styrene and other polymerizable monomers such as disclosed in U.S. Pat. No. 2,628,209. While thickening does occur it is relatively slow even when elevated temperatures are employed. Additionally, the thickening process is frequently non interruptible causing inconvenience to the manufacturer since relatively little time is available to process these thickened compositions once the desired viscosity has been achieved. Other thickening processes such as disclosed in U.S. Pat. No. 3,373,221 depend greatly on urethane linkages by being limited to resins having a large number of reactive hydroxyl groups present or alternatively adding a hydroxyl containing coreactant with the polyisocyanate to provide urethane thickening. Other nonorganic thickening agents such as metal oxides other than magnesium oxide greatly depend on the presence of acid groups on the resin to achieve thickening.

It has now been discovered that the addition of a polyisocyanate and a trimerization catalyst allows for the thickening of a large variety of polymerizable materials independent of any isocyanate reactive groups present on those polymerizable materials. According to the process of the invention there is therefore provided a method of increasing the viscosity of a thermoset resin dissolved in up to 90% by weight of a solvent and having a molecular weight of at least 500 which comprises mixing in an effective amount of a polyfunctional isocyanate and catalytic amount of trimerization catalyst selected from the class consisting of quaternary ammonium hydroxides, quaternary ammonium acetates, quaternary ammonium formates, alkali metal acetates and alkali metal formates to produce a thickened uniformly dispersed or solubilized polymerizable composition. According to the invention there is also provided a thickened uniformly dispersed or solubilized polymerizable composition which comprises a resin produced by mixing:

A. A blend of (1) up to 90 percent by weight of a solvent and (2) at least 10 percent of a polymerizable thermoset resin having a molecular weight of at least 500.
B. a polyfunctional isocyanate.
C. a catalytic amount of a trimerization catalyst selected from the class consisting of quaternary ammonium hydroxides, quaternary ammonium acetates, quaternary ammonium formates, alkali metal acetates and alkali metal formates.

The method of the present invention may be utilized to increase the viscosity of any solution of thermoset resin. Such solutions are most frequently thickened to compensate for a greater dilution of the resins in a solvent. Unfortunately, the substitution of more solvent for expensive resin usually translates in a product having reduced physical properties. Surprisingly, the present method produces compositions when cured which minimizes the loss of such properties. Additionally, the processing characteristics of the composition may be improved. For example a preferred embodiment of the above technique finds utility in thickening molding compositions, particularly sheet molding composition to achieve a controllable viscosity, resulting in a nontacky, from table, thickened composition having excellent handleability such that it can be stored and cut to size etc. before the final curing operation. Additional properties of the polymerizable materials are discussed hereinafter. Broadly defined, the polymerizable materials which may be thickened according to the present invention are thermoset materials which have a substantial molecular weight such as, for example, a minimum of about 500. The polymerizable materials must be soluble in a solvent and preferably contain little or no groups which are isocyanate reactive. Suitable polymerizable materials include a wide variety of thermosetting resins. For purposes of convenience the term thermoset resins used throughout the specification is meant to include polymerizable materials which when cured form thermoset resins. These resins may include any of the following.

Resin

Useful resins include ethylenically unsaturated polyesters which comprise the reaction product of at least one ethylenically unsaturated dicarboxylic acid and at least one polyol. A preferred class of polyesters are substantially free of aromatic hydroxyl groups. Exemplary of the polyols which may be used to form the polyester compositions are aliphatic glycols such as ethylene glycol, diethylene glycol, propylene glycol, dipropylene glycol, butane diol, hexanediol, trimethylolpropane, neopentylglycol, dibromoneopentyl glycol, pentaerythritol, and alkylene oxide ethers of phenols such as 2,2-di(4-hydroxyphenyl)propane, 2,2-di(3,5--dibromo, 4-hydroxyphenyl)propane; di(4-hydroxyphenyl) methane; 2,2-di(3-methyl-4-hydroxyphenyl)butane; 4,4'-dihydroxybiphenyl; hydrogenated 2,2-di(4-hydroxyphenyl)propane; 2,4,4'-dihydroxybenzophenone; 4,4'-dihydroxydiphenyl ether; 4,4'-dihydroxydiphenyl sulfone; and 4,4'-dihydroxydiphenol ketone. Mixtures of polyols may be used.

A preferred class of polyols are those represented by the general formula

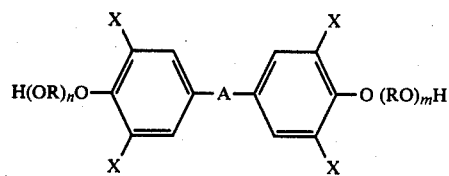

wherein n and m are integers and the sum of n and m is from 2 to 30, A is an alkylene radical having from 1 to 4 carbon atoms, X is hydrogen or halogen and R is an alkylene radical having from 2 to 4 carbon atoms. Polyoxyalkylene ether polyols corresponding to the above formula are disclosed in U.S. Pat. No. 2,331,265, the disclosure of which is incorporated hereinto by reference.

Illustrative examples of ethylenically unsaturated dicarboxylic acids and anhydrides which may be used to form the polyester compositions include maleic acid, fumaric acid, and maleic anhydride.

The aforesaid polyester resins may also be prepared by the reaction of a polyol and a mixture of an ethylenically unsaturated dicarboxylic acid and saturated dicarboxylic acid, such as, succinic, adipic, sebacic, azelaic, glutaric, phthalic, isophthalic, and terephthalic. The Diels Alder adduct of hexachlorocyclopentadiene and maleic anhydride (hereinafter called HET anhydride) HET anhydride maybe added to water to form HET dibasic acid. Preferably at least about 50% of the dicarboxylic acid moiety of the polyester composition is contributed by an ethylenically unsaturated dicarboxylic acid.

A more detailed description of the polyesters which may be used in accordance with this invention may be found in U.S. Pat. No. 2,634,251 and U.S. Pat. No. 3,214,491, the disclosure of which are hereby incorporated hereinto by reference.

Vinyl esters made through an addition reaction of an epoxy resin with a carboxylated monomer may also be thickened in accordance with the present invention. A preferred class of vinyl esters includes the reaction product of two moles of an unsaturated acid, such as methacrylic or acrylic acid, and an epoxy polymer, such as the diglycidyl ether of 2,2-di(4-hydroxyphenyl) propane, the diglycidyl ether of 2,2-di(3,5-dibromo, 4-hydroxyphenyl) propane, higher molecular weight homologues of these epoxies as well as the epoxy Novolaks. These resins are further discussed in U.S. Pat. No. 3,373,221 the disclosure of which is hereby incorporated by reference.

Urethane resins may also be thickened according to the present invention. These include vinyl ester urethane resins disclosed in U.S. Pat. No. 3,876,726 and U.S. Ser. No. 852,625 filed Nov. 18, 1977 and prepared by reacting (a) the reaction product of a polyoxyalkylene bisphenol A and a polycarboxylic acid or anhydride, (b) a polyfunctional isocyanate having an average isocyanate functionality of at least two, and (c) a monohydroxyl-terminated ester of acrylic acid or methacrylic acid resulting in products having the formula:

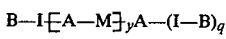

wherein

A is a radical derived from a polyoxyalkylene bisphenol A having the following formula:

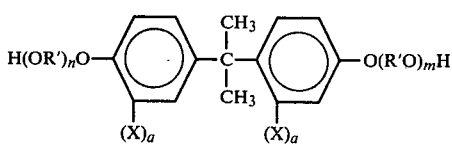

wherein

R' is $C_1$-$C_4$ alkylene group,

X is halogen or a $C_1$-$C_4$ alkyl group, a is an integer equal to from 0 to 2, and m and n are integers each of which is equal to at least 1 and the sum of which is equal to from 2.0 to about 30.0;

M is a radical derived from (A) and unsaturated, aliphatic, polycarboxylic acid or an anhydride thereof, (B) a saturated aliphatic polycarboxylic acid or an anhydride thereof, (C) an aromatic polycarboxylic acid or anhydride thereof or (D) mixtures of A, B, or C;

I is a radical derived from an isocyanate having an isocyanate functionality of at least 2;

B is a radical derived from a monohydroxyl-terminated ester of unsubstituted or substituted acrylic or methacrylic acid wherein the substitutents are halogen or $C_1$-$C_4$ alkyl groups;

Y is an integer equal to from 1 to about 12.

q is zero or one.

Various isocyanurate resins may also be thickened according to the invention. Preferred isocyanurates are those disclosed in U.S. Ser. No. 819,352 and 819,353 filed July 27, 1977 which are described as isocyanurates of urethanes of an aromatic polyisocyanate and at least one vinylidene carbonyl oxy alkanol.

Of particular interest are isocyanurates of urethanes of an aromatic polyisocyanate and at least one vinylidene carbonyl oxy alkanol characterized by one of the following formulae:

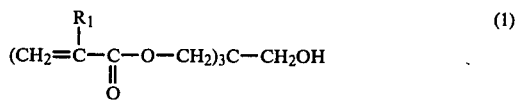 (1)

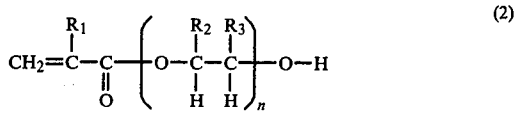 (2)

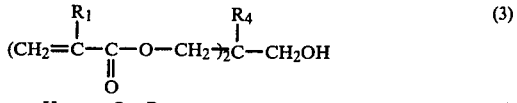 (3)

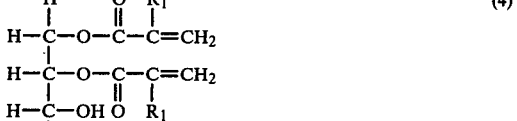 (4)

and

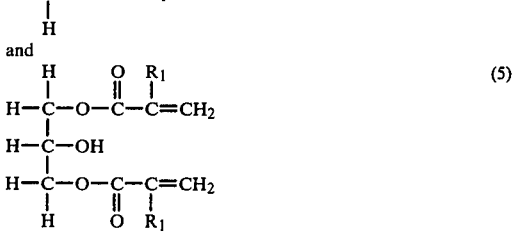 (5)

wherein $R_1$ is hydrogen or an alkyl group containing from 1 to 4 carbon atoms, $R_2$ is hydrogen, alkyl containing from 1 to 12 carbon atoms, or a chlorinated, brominated, or fluorinated alkyl group containing from 1 to 12 carbon atoms, $R_3$ is hydrogen, alkyl containing from 1 to 12 carbon atoms, or a chlorinated, brominated, or fluorinated alkyl group containing from 1 to 12 carbon atoms, $R_4$ is hydrogen, methyl or ethyl, and n is from one to four, with the proviso that $R_2$ and $R_3$ on adjacent carbon atoms are not both alkyl or chlorinated, brominated, or fluorinated alkyl, that is at least one of $R_2$ and $R_3$ must be hydrogen.

Solvent

As mentioned hereinabove the invention is applicable to thickening polymerizable materials dissolved in a solvent. The term solvent as used throughout the specification is meant to include dispersion medium. Preferred solvents are vinyl monomers which allows for a substitution of possibly expensive polymerizable materials with cheaper comonomers. Useful vinyl monomers include any which are non-reactive, that is, the solvent should preferably not contain any groups which would react with isocyanate groups or in any way interfere with the trimerization reaction. Thus, the solvent should not contain any hydroxyl, carboxy, or amine groups which might interfere with this reaction. This then preferably limits the suitable solvents to esters, ethers, hydrocarbons and similar solvents containing non-reactive groups. Illustrative examples of polymerizable solvents which may be employed in this process include styrene, methyl methacrylate, divinylbenzene, ethyl methacrylate, ethyl acrylate, methyl acrylate, 2-ethylhexyl acrylate, 2-ethylhexyl methacrylate, butyl acrylate, butyl methacrylate, isobutyl methacrylate, cyclohexyl methacrylate, cyclohexyl acrylate, chlorostyrene, acrylonitrile, vinylidene chloride, vinyl acetate, vinyl stearate, vinyltoluene, hexanediol diacrylate, hexanediol dimethacrylate, polyethylene glycol diacrylate, dimethylstyrene, ethylstyrene, propylstyrene, p-chloro-methyl styrene, m-dibromo-ethylstyrene, bromostyrene, t-butyl styrene, vinyl propionate, vinyl butyrate, tetrahydrofurfuryl methacrylate, N-vinylpyrrolidone, diethylene glycol diacrylate, triethylene glycol diacrylate, allyl methacrylate, diallyl fumarate, 1,3-butylene glycol dimethacrylate, polyethylene glycol diacrylate, tetramethylene glycol diacrylate, trimethylol propane triacrylate, neopentyl glycol diacrylate, and 1,3-butylene glycol diacrylate.

However non-polymerizable solvents may also be used. Illustrative solvents include benzene, toluene, xylene, dioxane, methyl ethyl ketone, ethyl acetate, and ethyl benzene. Mixtures of solvents may also be used.

A preferred class of solvents are those which contain at least one polymerizable double bond. A particularly preferred solvent is styrene. Other preferred solvents are a mixture of styrene and methyl methacrylate or a mixture of styrene and divinylbenzene.

The amount of solvent employed to dissolve the thermoset resins utilized in this invention may vary over a very wide range of from about 10 to 90% by weight of resin. The particular amount of solvent used will depend somewhat on the nature of the solvent and on the solubility of the particular resin composition used. The character of the trimerized polyisocyanate formed allows the maintenance of adequate working viscosities at relatively low concentrations of dissolved solids. However vinyl isocyanurate resin should preferably be dissolved in no more than 75% solvent by weight of solution. Products of this invention may be made which permit adequate laminate working viscosity, which is defined as 100 to 1,000 centipoises as determined on a Brookfield Viscometer, Model LVT, #2 spindle, at 30 rpm., at 25° C. The amount of solvent will also depend on the nature of the properties desired in the final cured product.

Polyfunctional Isocyanate

The polyisocyanate used in the process of this invention may be any trimerizable polyisocyanate which is conventionally used in the art for the preparation of isocyanurates. For example, the polyisocyanate may be saturated, unsaturated, monomeric or polymeric. The only requirements are that the polyisocyanate contain at least two isocyanate groups, be trimerizable, and be free of any groups which interfere with the trimerization of isocyanate groups or which interfere in the reaction of an isocyanate group with hydroxyl group.

Illustrative examples of polyisocyanates which are particularly useful include: 2,4-tolylene diisocyanate; 2,6-tolylene diisocyanate; m-phenylene diisocyanate; p-phenylene diisocyanate; 1,5-naphthalene diisocyanate; 4,4'-diphenyl ether diisocyanate; 4,4',4''-triphenylmethane triisocyanate; 2,4,4'-triisocyanatodiphenylmethane; 2,2',4-triisocyanato diphenyl; 4,4'-diphenylmethane diisocyanate; 4,4'-benzophenone diisocyanate; 2,2-bis(4-isocyanatophenyl)propane; 1,4-naphthalene diisocyanate; 4-methoxy-1,3-phenylene diisocyanate; 4-chloro-1,3-phenylenediisocyanate; 4-bromo-1,3-phenylene diisocyanate; 4-ethoxy-1,3-phenylene diisocyanate; 2,4'-diisocyanatodiphenyl ether; 4,4'-diisocyanatodiphenyl; 9,10-anthracene diisocyanate; 4,6-dimethyl-1,3-phenylene diisocyanate; 4,4'-diisocyanatodibenzyl; 3,3'-dimethyl-4,'-diisocyanatodiphenylmethane; 3,3'-dimethyl-4,4'-diisocyanatodiphenyl; 3,3'-dimethoxy-4,4'-diisocyanatodiphenyl; 1,8-naphthalene diisocyanate; 2,4,6-tolylene triisocyanate; 2,4,4'-triisocyanatodiphenyl ether; diphenylmethane diisocyanate available under the trademarks Mondur and Papi, having a functionality of 2.1 to 2.7; 1,3-xylene 4,6-diisocyanate; aromatic isocyanate terminated polyurethanes; aromatic isocyanate terminated prepolymers of polyesters; 1,6-hexamethylene diisocyanate; ethylene diisocyanate; propylene 1,2-diisocyanate; butylene 1,2-diisocyanate; butylene 2,3-diisocyanate; pentamethylene diisocyanate; cyclopentylene 1,3-diisocyanate; cyclohexylene 1,2-diisocyanate; cyclohexylene 1,3-diisocyanate; cyclohexylene 1,4-diisocyanate; 1,10-decamethylene diisocyanate; diisocyanato dicyclohexyl methane; 1,5-diisocyanato-2,2-dimethyl pentane; hydrogenated 4,4'-diphenylmethane diisocyanate; hydrogenated tolylene diisocyanate; and isocyanates having the following formulae or structures $(OCNCH_2CH_2)_2S$; $(OCNCH_2CH_2CH_2)_2O$; $OCNCH_2CH_2CH_2CH(OCH_3)CH_2CH_2NCO$; $OCNCH_2CH_2CH_2O(CH_2)_4OCH_2CH_2CH_2NCO$:

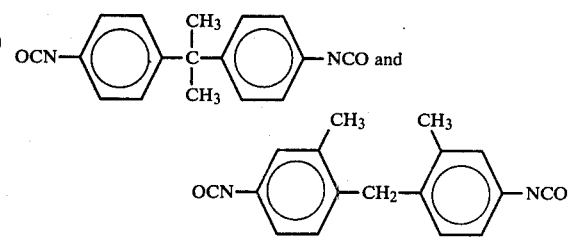

Preferred aromatic polyisocyanates are 2,4-tolylene diisocyanate 2,6-tolylene diisocyanate, 4,4'-diphenylmethane diisocyanate, polyphenylene, polymethylene polyisocyanates having an avery isocyanate functionality of 2.1 to 2.7, and mixtures thereof.

The polyisocyanate is added in an amount which is preferably at least a stoichiometric excess of the isocyanate reactive groups present in the thermoset resin solution. Unless the resins have a great number of such groups, for example, resins having a hydroxyl number in excess of 30, the polyisocyanate usually added in an amount of from about 2 to 10% by weight of the resin and solvent.

For resins having a higher (above 30) hydroxyl number less than a stoichiometric excess of polyisocyanate is suggested to avoid excessive crosslinking which results in undesirable intractable materials.

Catalyst

Trimerization catalyst essential to the practice of the present invention may include any trimerization catalyst selected from the class consisting of quaternary ammonium hydroxides, quaternary ammonium acetates, quaternary ammonium formates, alkali metal acetates and alkali metal formates and preferably are those which are also soluble in reaction mixture.

Illustrative examples of such catalysts include N-benzyltrimethylammonium hydroxide, N-benzyl trimethyl ammonium acetate, N-benzyl tetramethyl ammonium acetate, tetraethyl ammonium acetate, N-benzyl tri-methyl ammonium formate, tetramethyl ammonium hydroxide, potassium acetate, sodium formate, potassium formate and sodium acetate. A preferred catalyst is potassium acetate. The catalyst in general is effective when present in an amount of from about 0.002 to 1% by weight of resin solution. A preferred range is from 0.02 to 0.4% by weight of resin solution.

Viscosity Range

The solution viscosity of the thickened polymeric systems of this invention can be varied over a wide range, by adjusting the amount of isocyanate used or trimerization catalyst or trimerization temperature as well as by varying the amount of solvent used, or by terminating the reactions when the desired viscosity has been achieved. Thickened resins of great viscosity such as sheet molding composition cannot be terminated by such means as the addition of acid due to the inherent difficulty of mixing the acid into the composition. In such instance it is therefore particularly desirable to carefully select just the right amount of isocyanate and catalyst and adjust to processing conditions to achieve the desired viscosity. In general higher amounts of isocyanate or catalyst or higher temperatures favor increased viscosities. In this manner systems viscosities up to 160 million cps may be obtained. Polyisocyanate addition of less than about 2% by wt. will have little or no effect, above 20% high network density will cause excessive crosslinking or insoluble precipitate formation. A general range is 2–10%, of polyisocyanate, a preferred range is 4 to 8% of polyisocyanate by weight of resin solvent composition. Where polyisocyanates with a functionality of greater than 2 are used, the percent isocyanate which the system can tolerate and which will be required to obtain a given viscosity will be less.

The unusually rapid rate of thickening which occurs in general during the process of the invention is believed to be due to the formation of an interstial network of polyisocyanurate formed within the polymerizable molecules of thermoset resin dissolved in solvent. Although the applicant does not wish or intend to be bound by this theory it is believed that the polyisocyanate interspersed throughout the resin solvent composition when trimerized forms such a network to hold the polymerizable resin/solvent composition in place. It is noted that, if the resin has a molecular weight of less than about 500 the trimerized polyisocyanate tends to precipitate or otherwise indicate phase separation. It is the formation of a multicomponent system, wherein each component be it the resin, solvent, polyisocyanate or trimerized polyisocyanate remains mutually compatible to the system, without affecting the desired homogeniety of the dispersed or solubilized nature of the system, that appears to provide a major factor in the realization of optimum processing and product properties.

It has also been noted that the thickening of resins possessing a relative high number of hydroxyl groups such as above 30 is more prone to form intractable materials. This is believed to be fue to an excessive degree of crosslinking. Such crosslinking is believed to be minimized when fewer hydroxyl groups are present in the resin. Such resin having a high hydroxyl number however may be thickened satisfactorily by employing less than an excess of polyisocyanate. In general resins possessing an hydroxyl number of less than 30 should be thickened by utilizing preferably a 2 to 10% amount by weight of polyisocyanate. The same range however may be used to thicken high hydroxyl number resins despite the fact that one would initially assume that all the available isocyanate groups would be used in the formation of urethane formation. Surprisingly under proper process conditions it is believed that the trimerization reaction proceeds at a more rapid pace than the urethane reaction. Proper processing conditions which promote the trimerization reaction in preference to the undesirable urethane reaction involve the selection of highly effective trimerization catalysts and temperatures which accentuate polyisocyanurate formation.

Thickening Conditions

With systems containing vinyl unsaturation the trimerization temperature should be maintained within the ambient to 110° C. range, since too high a temperature may cause polymerization of the vinyl system. Certain free-radical polymerization catalysts may be activated at temperatures below 110° C. The presence of such catalyst will therefore limit the reaction temperature of trimerization to a temperature below the activation temperature of the catalyst. Certain trimerization catalysts, such as quaternary ammonium compounds may decompose at temperatures above 90° C. Therefore, heating the system terminally above the decomposition temperature of the trimerization catalyst may be useful as a technique to deactivate the catalyst and may limit the actual trimerization temperature employed. The preferred range is 25°–90° C.

In general the thickening process may follow the procedure where polyisocyanate is added slowly over 2–30 minutes to a solution of the polyester resin in styrene containing 0.1–1.0% of a trimerization catalyst, and the reaction temperature kept at 50°–75° C. The viscosity build-up is monitored and the reaction stopped when the desired viscosity has been obtained. This will occur in a few minutes or after many hours depending on the temperature and the polyisocyanate used and the catalyst concentration. The viscosity build-up can be followed during the reaction by such techniques as measuring flow rates within the reaction flask with calibrated diptubes. When the desired viscosity is reached the reaction can be quenched by the destruction of the catalyst using acids such as methanesulfonic acid, or by destruction of residual isocyanate functions by using amines or alcohols. Alternatively the final viscosity can be preselected by using the proper amount of polyisocyanate and allowing the reaction to go to completion.

The presence of water in the polymerizable solutions is detrimental to the reaction and may cause cloudiness and/or precipitate formation. It was found that best results could be obtained if the water content was kept below 0.2%.

When ethylenically unsaturated reaction products prepared by the process of this invention are to be used shortly after their preparation, the addition of stabilizers is not necessary. However, when it is desired to store the isocyanurate containing reaction product for a long period of time, it may be desirable to add a chemical compound which will react with the trimerization catalyst or to add a stabilizer to prevent polymerization through the ethylenic double bond or reaction of any residual isocyanate groups which may be present in the product.

Exemplary of compounds which may be added to the final reaction product to neutralize the trimerization catalyst include acids such as acetic, phosporic, sulfuric, oxalic, methanesulfonic, maleic, fumaric, acrylic, phthalic, isophthalic, and pyromellitic acids. The use of methanesulfonic acid or a mixture of methanesulfonic acid and oxalic acid are preferred. The amount of acid to be added varies with the particular isocyanate, trimerization catalyst and activity of resin system. Generally the amount of acid should range between about 50 and 200 mole percent, and preferably from about 100 to about 175 mole percent, of the trimerization catalyst used. If the combination of methanesulfonic acid/oxalic acid is used, the amount of oxalic acid should be in the range of 0.02 to 0.05 weight percent based on the total weight of resin solution.

The addition of an acid to neutralize the trimerization catalyst is effective to impart extended shelf life to the products of this invention, particularly in the case of solutions containing at least 40% by weight of dissolved solids. Levels of residual isocyanate content of up to 0.15% and even up to 0.2% at the time the trimerization reaction is terminated with an acid, such as methane sulfonic acid, do not cause serious stability problems. However, it has been found that levels of isocyanate content above 0.1% in solutions having a concentration of less than 40% by weight of dissolved solids at the time the trimerization reaction is terminated with the addition of the acid, may adversely affect the shelf stability of the reaction mixture. For this reason it may be desirable for the maintenance of shelf life of these low solids solutions to reduce the residual NCO to levels below 0.1% through the addition of small amounts of compounds with labile hydrogen which react with NCO, such as alcohols and primary or secondary amines. Low molecular weight alcohols such as methanol, ethanol, propanols, and butanols and secondry amines are preferred. Dibutyl amino is the most preferred of those compounds. These labile hydrogen containing compounds are added to the resin solution at the end of the trimerization reaction in amounts equivalent to or slightly higher than the residual NCO at that point.

The unsaturated compositions prepared by the process of this invention may be polymerized or cured in accordance with polymerization conditions conventional in the art for the polymerization of ethylenically unsaturated materials. In general, the polymerization may be carried out by reacting the unsaturated product in the presence of a polymerization catalyst. Suitable polymerization initiators include the various peroxide initiators such as benzoyl peroxide, methyl ethyl ketone peroxide, di(2-ethylhexyl) peroxydicarbonate, t-butyl perbenzoate, dicumyl peroxide, and t-butyl hydroperoxide. Other polymerization catalysts which may be used include azo type initiators such as azobisisobutyronitrile. The amount of initiator employed is usually very small. For example, from about 1 part of initiator per 1000 parts of the polymerizable mixture to about 5 parts per 100 parts of said mixture.

In many applications, it is desirable to start the polymerization without the application of external heat. In such cases it is customary to add an accelerator to the system. Suitable accelerators include cobalt, manganese, lead, and iron compounds, such as cobalt naphthenate and manganese naphthenate, and tertiary amines such as dimethyl aniline.

The following are three illustrative examples of peroxide-promoter formulations which may be used to cure the unsaturated products of this invention:

Formulation I
1% Benzoyl peroxide
0.2% Dimethyl aniline

Formulation II
0.02% Dimethyl aniline
0.06% Cobalt naphthenate
2.0% Methyl ethyl ketone peroxide Formulation III
0.3% Cobalt naphthenate
0.5% Acetylacetone peroxide (4% active oxygen)
1.5% t-butyl perbenzoate In order to avoid premature polymerization of the compositions of this invention, a small amount of a conventional polymerization inhibitor, such as hydroquinone, methyl ether of hydroquinone, phenothiazine, and tertiary butyl catechol, may be incorporated either into the reaction mixture prior to the addition of the isocyanate or into the final product or both. For sheet molding applications stable inhibitors which do not react with isocyanate are preferred. A particularly preferred inhibitor for such applications is phenothiazine.

The resulting product, may contain any of the additives which are conventionally employed in polymerization systems, for example, antioxidants, U.V. absorbers, dyes, pigments, and mold release agents.

Thickened products prepared according to this invention, in monomeric vinyl solvents have been found particularly useful in applications such as castings, laminates, SMC or BMC where it is desirable to have excellent flexural and tensile properties. Additionally these applications may benefit by the excellent process properties of the composition of the invention in the area of curing rates, low reaction exotherms, faster mold cycles or faster preform formation due to faster thickening. The products of this invention may be used alone or in combination with other ethylenically unsaturated monomer compositions. In addition, these products may be used in combination with inorganic fillers, such as calcium carbonate, magnesium oxide, alumina trihydrate to improve fire retardant properties and other additives to reduce shrinkage; or other polymerizable resins, such as general purpose polyester resins. The products of this invention are especially useful when used in combination with glass fibers or other fibers to produce reinforced structure, such as laminates and pipe.

In recent years the automobile industry has been striving to reduce weight of most newly manufactured vehicles as a means for increasing gas mileage. A most attractive way to reduce weight is to switch from metal to light-weight plastic components. However, plastics are inherently weak and must be highly reinforced to meet tensile strength requirements of certain components such as wheels, brackets and structural panels. In order to meet this strength requirement, resins must be reinforced with materials such as glass fiber filaments in high concentrations, mostly exceeding 50% by weight. Composition having large amounts of filler, while producing very strong completely cured resins are difficult to mold into articles having uniformly distributed reinforcing materials. In producing molded articles having intricate shapes wherein a preform containing fibrous filler is squeezed between the male/female sections of the mold and the flowout exceeds 30%, it is difficult to obtain a uniformly filled article. Usually resin material flows away from the fibrous filler leaving the article more highly filled in the region of the preform and scantly filled at the mold extremities or locations of maximum flowout.

In extruding and molding conventional ethylenically unsaturated polyester resins, a high concentration of fiberglass reinforcing agent is required to produce a molded article having suitable strength. However, as the concentration of fiberglass is increased, the amount of thickening agent such as a conventional cross-linked polyurethane may also be increased. When the concentration of urethane is increased, the amount of available polyester resin is decreased, thereby diluting the high strength and flexibility characteristics of the fully cured base resin. With the combination set forth in the present invention, physical properties, such as flex strength and heat distortion temperature, are not adversely affected the use of the present thickening method as demonstrated by the examples. It is now possible to make thickened thermoset resin glass reinforced articles of complex shape having better uniformity and strength throughout.

The properties of the shaped articles of the invention, such as the flexural and notched impact strength are improved by incorporating fibrous reinforcing materials prior to the thickening process and before the addition polymerization reaction has been completed. The fibrous materials may be, for example, glass fiber, graphite fiber, asbestos fiber, or fibrous materials derived from well-known organic polymers such as aramide fibers. These fibrous materials may be in any suitable form, for example, in the form of cloth, a mat, ribbon, tapes, chopped staple filaments or as loosely woven veils. Furthermore, they may range in length from fibrils to continuous filaments. Usually glass fibers in the range of 1–10 cms. in length are used for sheet molding applications. The amount of fibrous material to be incorporated will depend upon the desired improvements in the strength desired of the shaped article. In general, from 5 to 80% based on the total weight of the shaped article is sufficient. Where it is desirable to affect a substantial improvement in strength properties, 60–80% by weight of reinforcing agent may be required.

In addition to the fibrous materials, other fillers, such as carbon black, clay, iron oxide, lithopone, mica, silicones, siliacious materials, titanium dioxide and colored pigments may be added at some convenient time during the intermixing and preparation of the gellation precursors.

In order to describe the present invention so that it may be more clearly understood, the following examples are set forth. These examples are given primarily for the purpose of illustration and any enumeration of detail contained therein should not be interpreted as a limitation on the concept of the present invention.

In the examples the resins are designated by the names Resin I, Resin II etc. The designated resins are further characterized as follows:

RESIN I

Resin I is a vinylisocyanurate resin dissolved in styrene and prepared according to the following procedure. A chemical reactor equipped with agitator, condenser, gas pipe connections, vents and port holes is first flushed with subsurface nitrogen. Subsequently an air sparge and nitrogen stream having relative flow rates of 1 to 3 are introduced into the reactor. 2.7 parts of hydroxypropylmethacrylate (HPMA) are then charged to the reactor. The air sparge and nitrogen streams are temporarily turned off and 0.0029 parts of copper acetate monohydrate and 0.012 parts of 20% solution of tertiary butyl catechol (TBC) in styrene are charged to the reactor under continuous agitation. The air sparge and nitrogen blanket streams are turned on again and 5.7 parts of styrene are charged to the reactor. The reaction mixture is then heated to about 40° C. When the temperature of the reaction mixture reaches 40° C. the incremental addition of an 80/20 mixture of 2,4- and 2,6-toluene diisocyanates (TDI) starts. An overall amount of 3.1 parts of TDI are charged over about one hour period. During this period the exotherm of the reaction of TDI with the alcohol raises the temperature of the reaction mixture to about 90° C. If at the end of the TDI addition the temperature is lower or higher than 90° external heating or cooling is applied respectively to bring the temperature to about 90° C. The reaction mixture remains at about 90° C. for at least one hour after the total amount of TDI has been added and until the NCO content of the reaction mixture drops to below 4.5% by weight. After both conditions are met the reaction mixture is cooled to about 50° C. 0.018 parts of 40% solution of benzyltrimethylammonium hydroxide in methanol (TritonB) (a trimerization catalyst), are then added to the reaction mixture. Soon after the addition of Triton B an exothermic reaction starts during the duration of which the temperature of the reaction mixture is maintained between 50°–60° C. From the time the exotherm appears the viscosity and NCO content of the reaction mixture are monitored very closely. When the viscosity of the reaction mixture reaches 400–500 cps and the NCO level drops to below 0.2%, 0.007 parts of methanesulfonic acid are added to the reaction mixture and the mixture is then cooled. When the temperature reaches about 35° C., 0.014 parts of TBC are added and the reaction is then cooled to room temperature. The resulting vinyl isocyanurate is clear, has a light yellow brown color, a viscosity of about 400–500 cps and a shelf life longer than 3 months.

RESIN II

Resin II is a vinyl maleate urethane resin available from ICI Americas Company as ATLAC®580-05 resin, which is a 50% styrene solution of the urethane resin.

RESIN III

Resin III is a bisphenol A fumarate resin available from ICI Americas Inc. as ATLAC®382-05 resin which is a 50% styrene solution of the fumarate resin.

RESIN IV

Resin IV is a bisphenol A fumarate resin available from ICI Americas Inc. as ATLAC®382 resin dissolved as a 35% styrene solution.

RESIN V

Resin V is the reaction product of methacrylic acid with the diglycidyl ether of Bisphenol A available from Dow Company a DERAKANE®411-45 resin.

RESIN VI

Resin VI is a general purpose unsaturated polyester resin available from the Marco Chemical Company a division of the W. R. Grace Company as MARCO®GR-400 resin.

In the examples, the following standard tests, procedures, and components were employed:

Castings were prepared by pouring the resin-containing composition into a mold comprising two glass plates, each of which had previously been coated with a mold release agent, spaced $\frac{1}{8}$ inch apart, and sealed together on three edges. After the composition was poured into the mold, the fourth edge was sealed and the composition was allowed to cure at room temperature for 24 hours. At the end of this time, the composition was postcured by heating in an oven at 100° C. for 4 hours after which it was cooled, removed from the mold and rested.

Laminates unless otherwise indicated were prepared by impregnating a fiberglass mat with the resin-containing composition. The procedure employed was as follows:

a. A sheet of polyethylene terephthalate film was placed on a flat surface.
b. A continuous fiberglass mat (C glas veil) was placed on this layer, and coated with a layer of the resin composition.
c. A chopped fiberglass mat 1½ oz. weight was placed on this layer, pressed into intimate contact therewith, and coated with another layer of the resin composition.
d. Similarly, a second chopped fiberglass mat, another continuous fiberglass mat (veil), and a second sheet of polyethylene terephthalate film were added, separated by layers of the resin-containing composition.

The resulting article was allowed to cure at room temperature for 24 hours. At the end of this time, it was postcured by heating in an oven at 100° C. for 4 hours. The polyethylene terephthalate films were removed and the physical properties of the laminate measured.

SMC PREPARATION

Sheet molding compound (SMC) may be prepared by using an I. G. Brenner 24" SMC machine. The machine settings and speeds discussed below may vary slightly depending on the type and size of machine used.

In the practice of the invention to form a fully cured article from the tractable handleable, moldable composition of the invention, essentially three steps are taken:

The first step is the mixing of the ethylenically unsaturated comonomer resin system with from 2–10% of polyisocyanate and from 0.1–1% of a trimerization catalyst. This can be done by automatic mixing and metering to the SMC machine, or by batch mixing and then pouring the batch into the SMC machine.

In the batch process, the polyisocyanate and the trimerization catalyst is added to the monomer resin solution and then is mixed using a Cowles Dissolver, or other similar equipment. The blended material is then split into equal portions for pouring on the front and back doctor blades. It is desirable that the temperature of the mixed ingredients not exceed 85° F. to minimize high viscosity buildup which may result in poor glass wet-out. The viscosity of the non-thickened blend is in the 500–700 cps range for unfilled SMC.

After the liquid is poured into the doctor blade reservoirs, the machine is engaged. The polypropylene film is fed with the treated side up. The glass dropper is set at 250 rpm and produces one inch length cut glass. The line speed is 10 feet per minute. The doctor blade openings are calibrated to monitor the desired resin-glass ratio. When the doctor blades are set at 32 mils a 35 percent resin/65 percent glass SMC mat is produced which weigh approximately eleven ounces per square foot.

After the glass and resin are deposited on the polypropylene, the second sheet of polypropylene containing resin is placed on top and the resin system passes through a kneading roll to remove entrapped air. The SMC then goes through compaction rolls which should be heated uniformly to 100° F.±2° F. to enhance glass wet-out and facilitate uniform maturation.

The SMC is rolled up on the take-off roll and then taken off the machine and tightly wrapped with an aluminum/cellophane composite film. The side ends of the wrapper should be pushed into the core hole. This will minimize loss of monomer by evaporation.

The rolls are then stored at room temperature and the product is matured for molding within twentyfour to fortyeight hours. The maturation will depend on the formulation and temperatures utilized. Sheet molding compounds prepared by this process remain stable for several months. It should be noted that a hot room is not necessary for regular processing of the thickened resins.

To demonstrate the molding of the matured sheet composition, three $8\frac{3}{4} \times 8\frac{3}{4}''$ squares are cut from the large rolls after removal of the polypropylene film from each side. The squares are stacked on top of each other, and placed at the center of an 11 inch square mold. The total weight of the 3 sheets was in approximately 400 to 500 grams. The squares are compressed at 400 lbs./sq. in. pressure for 2½ minutes at 225° F. The cured 11"×11" is tested for good flow out as evidenced by even "flash" on all four sides.

The examples demonstrate the maturation rate, molding conditions and the physical properties obtained for the cured products of resins prepared into sheet molding compositions by the above procedure unless otherwise indicated.

Tensile strength was measured in accordance with A.S.T.M. Standard D-638-71a.

Flexural strength was measured in accordance with A.S.T.M. Standard D-790-71.

Barcol Hardness was determined in accordance with A.S.T.M. Standard D-2583-67.

Elongation was measured in accordance with A.S.T.M. Standard D-638-71a.

Heat distortion temperature (HDT) was measured in accordance with A.S.T.M. Standard D-648-72.

Charpy impact and Izod impact were determined in accordance with A.S.T.M. Standard D-256.

The percent free NCO was determined by titration employing the method described in Union Carbide Bulletin F-41146 entitled "Urethane Coatings Chemicals" at page 24.

The hydroxyl number refers to the number of milligrams of potassium hydroxide equivalent to the hydroxyl content of one gram of the resin.

RUBINATE ®M isocyanate referred to in the examples is a polymethylene polyphenyl isocyanate having an average isocyanate functionality of 2.7 which is commercially available from Rubicon Chemicals Inc.

SMC machine referred to in the examples is an I. G. Brenner 24" SMC machine.

Amoco high impact styrene is a polystyrenebutadiene copolymer available from Amoco.

Vazo 64 is a polymerization catalyst available from the DuPont Company.

Viscosity measurement were determined by a Brookfield viscometers. Viscosities of less than 2 million cps at 25° C. were measured on a Brookfield LVT Model. Viscosities of more than 2 million cps at 25° C. were measured on a Brookfield HBT Model.

MDI referred to in the examples is diphenylmethane diisocyanate commercially available from the Upjohn Company.

EXAMPLE 1

In a 2 gallon mixing vessel using a Cowles dissolver for mixing, the following ingredients were compounded in the order listed:

| | |
|---|---|
| Resin I | 2686.8 g |
| RUBINATE M isocyanate | 186.8 g |
| Zinc stearate | 28.7 g |
| Phenothiazine | 0.29 g |
| 2,2'-Azobis(isobutyronitrile) Vazo 64 | 14.40 g |
| Benzyltrimethylammonium hydroxide 40% in MgOH | 14.40 g |

A sample of this slurry was gathered in an 8 oz. jar and monitored for viscosity increase:

| Maturation Time | Viscosity, cps R.T. |
|---|---|
| 2¾ hrs | 64,000 |
| 24 hrs | 5,600,000 |
| 95 hrs | 7,520,000 |

The remainder of the slurry was compounded with 1" glass strand in an SMC machine to give a sheet consisting of 35% resin and 65% glass. The compounded sheet was rolled between polypropylene sheets and stored at room temperature for 5 days.

After the 5 day storage the sheet stock was examined and found to have a good drape suitable for compression molding.

Three square 8¾"×8¾" pieces of the 5 day old SMC, weighing 445 g, were placed in an 11"×11" mold and cured at 225° F. under 400 psi pressure for a period of 2½ minutes. A cured plaque resulted which had filled the mold with little or no additional flash off of resin. The glass well distributed throughout the plaque. No blistering was observed.

The physical properties observed for this molding were as follows:

| | |
|---|---|
| Tensile Strength 73° F. (psi) | 39,430 |
| Tensile Strength 300° F. (psi) | 23,200 |
| Tensile Modulus 73° F. ($10^6$ psi) | 2.54 |
| Tensile Modulus 300° F. ($10^6$ psi) | 1.94 |
| Flexural Strength 73° F. (psi) | 67,100 |
| Flexural Strength 300° F. (psi) | 25,200 |
| Flexural Modulus 73° F. ($10^6$ psi) | 2.20 |
| Flexural Modulus 300° F. ($10^6$ psi) | 1.20 |
| Izod (notched) (ft-lb per inch of notch) | 29.6 |

EXAMPLE 2

To a 2 gallon mixing vessel using a Cowles dissolver as the agitation system was added the following ingredients:

| | |
|---|---|
| Resin I | 1870.0 g |
| RUBINATE M isocyanate | 130.0 g |
| 2.5% Phenothiazine in styrene | 8.0 g |
| Zinc stearate | 20.0 g |
| 2,2'-Azobis(isobutyronitrile) (Vazo 64 initiator) | 10.0 g |
| Potassium acetate solution comprising 49.0g KOAC, 49.0g ethylene glycol and 2.0g H$_2$O | 6.7 g |

The above ingredients were agitated vigorously.

An 8 oz. container full of the slurry was sampled for monitoring thickening. The observed viscosity build up is recorded as follows:

| Maturation Time (hrs) | Viscosity (cps) |
|---|---|
| 3.0 | 43,000 |
| 5⅛ | 208,000 |
| 22.0 | 928,000 |
| 70.0 | 1,920,000 |

The remainder of the slurry was compounded with 1" chopped Owens Corning 433 AA glass strand on an SMC machine to give a sheet compound consisting of 35% by wt. of resin slurry and 65% by wt. of glass strand. The sheet stock was rolled between two sheets of polypropylene and stored at room temperature.

Sixteen days after the sheet stock has been compounded it was unrolled for molding. The sheet had a good drape and was not tacky. Three 9"×9" pieces were cut from the sheet stock. The total wt. of the pieces was 435.0 grams. These pieces of sheet stock were placed in an 11"×11" mold and cured at 225° F. and 800 psi of pressure for a period of 5 minutes. A small amount of flash off of resin resulted.

The sample spread evenly to fill the mold and cured to a hard amber colored plaque.

The plaque was tested for physical properties with the following results:

| | |
|---|---|
| Tensile Strength 73° F. (psi) | 40,500 |
| Tensile Modulus 73° F. ($10^6$ psi) | 2.43 |
| Flexural Strength 73° F. (psi) | 66,600 |
| Notched Izod (ft-lbs per inch of notch) 73° F. | 29.70 |
| Barcol | 48-62 |

EXAMPLE 3

The following ingredients were mixed in an 8 oz. container.

| | |
|---|---|
| Resin II | 186.0 g |
| RUBINATE M isocyanate | 14.0 g |
| 2.5% Phenothiazine in styrene | 0.8 g |
| Benzyltrimethylammonium hydroxide | 1.0 g |

The sample was allowed to maturate at room temperature. The observed viscosity increase is noted:

| Maturation Time (hrs) | Viscosity (cps) |
|---|---|
| 0 | 410 |
| 72 | 7,600,000 |
| 144 | 11,000,000 |

EXAMPLE 4

The following ingredients were combined in a 2 gallon mixing vessel using a Cowles dissolver for agitation.

| | |
|---|---|
| Resin I | 1860.0 g |
| Toluene diisocyanate | 140.0 g |
| 2.5% Phenothiazine in styrene | 12.0 g |
| 2,2'-Azobis(isobutyronitrile) (Vazo 64) | 10.0 g |
| Benzyltrimethylammonium hydroxide | 10.0 g |

An 8 oz. container of the slurry was sampled and monitored for viscosity build-up.

| Time (hrs) | Viscosity (cps) |
|---|---|
| 0 | 600 |
| 2 | 63,000 |
| 3.5 | 220,000 |
| 20 | 2,000,000 |

The remainder of the slurry was compounded with 1" Owens Corning 433 AA chopped glass strand on an SMC machine to give an approximate 35:65, resin to glass, sheet stock. The sheet was rolled between 2 polypropylene sheets and stored at room temperature. After 3 days the sample was unrolled and was found to be non-sticky with a drape suitable for molding. Three 8½"×8½" pieces were cut from the sheet and placed in an 11"×11" mold. The sample was cured at 225° F. under 250 psi of pressure for 5 minutes.

The resulting plaque had filled the mold with very little flash-off of resin. The physical properties observed for this plaque are listed:

| | |
|---|---|
| Flexural Strength (psi) 73° F. | 47,700 |
| Flexural Strength (psi) 300° F. | 16,800 |
| Flexural Modulus ($10^6$ psi) 73° F. | 1.95 |
| Flexural Modulus ($10^6$ psi) 300° F. | 1.00 |
| Barcol at 73° F. | 49–69 |
| Barcol at 300° F. | 20–26 |

EXAMPLE 5

The following ingredients were mixed in an 8 oz. jar.

| | |
|---|---|
| Resin III 38 | 100.0 g |
| Toluene diisocyanate | 5.0 g |
| Benzyltrimethylammonium hydroxide | 0.5 g |

The sample was allowed to maturate at room temperature. The following viscosity increase was observed:

| Maturation Time (hrs) | Viscosity (cps) |
|---|---|
| 0 | 560 |
| 24 | 104,000 |
| 48 | 3,200,000 |
| 72 | 44,800,000 |
| 9 days | 96,000,000 |

Although the sample thickened to the degree noted the sample maintained its clear light yellow appearance. No turbidity or opacity developed.

The next examples were all performed in an appropriate sized mixing vessel, for example 300 grams resin quantities were mixed in a 500 ml vessel, 400 grams resin quantities were mixed in a 1000 ml vessel etc.

EXAMPLE 6

To 300 g of Resin II (50% styrene), heated to 75° C., were added 500 mg hydroquinone, 0.15 ml potassium acetate catalyst solution, and 10 ml toluenediisocyanate over 22 minutes. After heating for an additional 18 minutes the reaction was quenched with 0.7 ml hydroxypropylmethacrylate and 0.25 ml dibutylamine. To 200 g of the above solution were added 200 g of styrene. The resulting solution had a viscosity at 25° C. of 190 cps. A corresponding unthickened solution has a viscosity of 20 cps.

EXAMPLE 7

To 400 g of Resin II (50% styrene), heated to 75° C., were added 200 mg hydroquinone, 1.04 ml of potassium acetate catalyst solution, and dropwise 20 ml toluenediisocyanate over 20 minutes. After heating for an additional 58 minutes, analysis showed 30% remaining free isocyanate. The reaction was quenched with 17 ml dibutylamine and 0.4 methanesulfonic acid within 12 minutes at 76° C. IR data showed no residual NCO groups. The above solution was protected with 200 mg hydroquinone. The viscosity at 25° C. was 862 cps. The starting viscosity was 190 cps.

EXAMPLE 8

To 400 g of Resin II (50% styrene), heated to 75° C., were added 200 mg hydroquinone, 1.04 ml potassium acetate catalyst solution and dropwise 16 ml toluenediisocyanate over 14 minutes. Heating was continued for 40 minutes at which time 7.4% residual NCO remained. The reaction was quenched with 0.4 ml methanesulfonic acid and 1 ml dibutylamine. The solution was protected with 200 mg hydroquinone. The viscosity at 25° C. was 3900 cps. The starting viscosity was 190 cps.

Castings made with the above products had properties given in Table I.

TABLE I

| Casting Properties of Thickened VMU Resins (⅛") | | | |
|---|---|---|---|
| | EX. 6 | EX. 7 | EX. 8 |
| Flex Strength 73° F. (psi) | 17,000 | 22,700 | 21,500 |
| Flex Modulus 73° F. ($10^6$ psi) | 0.47 | 0.48 | 0.48 |
| Barcol Hardness | 28–32 | 36–40 | 33–38 |
| Heat Distortion T | 95° C. | 114° C. | 102° C. |
| Charpy Impact ft-lbs per inch | 7.68 | 6.90 | 7.49 |

EXAMPLE 9

To 400 g of Resin II (50% styrene), heated to 75° C., were added 200 mg hydroquinone, 0.5 ml benzyltrimethylammonium hydroxide (40% in methanol) and 14 ml toluenediisocyanate dropwise over 13 minutes. After 2½ hours at 74° C. IR data indicated that most of the NCO groups had reacted. The reaction was quenched with 1 ml hydroxypropylmethacrylate and 200 mg hydroquinone. The viscosity of the product at 25° C. was 5000 cps. The starting viscosity was 190 cps.

EXAMPLE 10

A solution of 50 g Resin II (50% styrene and 3.0 g methylenediphenylene diisocyanate (MDI), 100 mg hydroquinone and 6 drops potassium acetate catalyst solution was heated at 75° C. for 1 hour. There was a definite increase in viscosity. The product has a cloudy liquid.

Thickened dilute solutions may be obtained in two ways. The dilute solution can be thickened directly, or it may be adjusted to the proper concentration after thickening of a more concentrated solution. Both techniques are demonstrated below:

EXAMPLE 11

To 1260 g of Resin III (50% styrene) and 540 g styrene, heated to 75° C. were added 320 mg hydroquinone, 1 ml potassium acetate catalyst solution and 20 ml toluenediisocyanate dropwise over 8 minutes. Reaction was continued for 7 hours. IR analysis showed no remaining NCO groups. Viscosity at 25° C. was 540 cps. The viscosity of an unthickened 65% styrene solution is 100 cps.

EXAMPLE 12

To 1260 g of Resin III (50% styrene) heated to 75° C. were added 320 mg hydroquinone, 1 ml potassium acetate solution and 20 ml toluene-diisocyanate dropwise over 4 minutes. Reaction was continued for 4 hours. IR analysis showed no remaining NCO groups. To this solution were added 320 mg hydroquinone and 540 g styrene. Viscosity at 25° C. was 800 cps. The resulting product contains 65% styrene.

The properties of this resin system in castings and laminates is given in Table II.

EXAMPLE 13

To 50 g of Resin IV (35% in styrene) were added 50 mg hydroquinone, 1 g toluenediisocyanate and 0.2 ml 40% solution benzyltrimethylammonium hydroxide in methanol. The solution after 16 hours at 50° C. had a viscosity at 25° C. of 390 cps.

TABLE II

Casting and Laminate Properties of Thickened Low Solids Resin III

| Properties | Casting of Thickened Resin II of Ex. 14 | Laminate of Thickened Resin III of Ex. 14 |
|---|---|---|
| Flexural Strength, psi | 17600 | 16300 |
| Flexural Modulus, 10⁶ | 0.46 | 0.76 |
| Barcol | 39–43 | 43–49 |
| Tensile Strength, psi | 10500 | 12500 |
| Tensile Modulus, 10⁶ | 0.33 | 0.78 |
| % Elongation | 5.93 | 1.85 |
| HDT, °C. | 89 | — |
| Charpy | 5.20 | — |
| Notched Izod | — | 9.24 |
| % Glass | — | 24.77 |

EXAMPLE 14

To 100 g of Resin V (45% in styrene) were added 50 mg hydroquinone, 300 mg potassium acetate solution and dropwise at 70° C., 2 ml toluenediisocyanate. The solution was heated for 1½ hours at 70° C., at which time all isocyanate had reacted. The reaction was stabilized by the addition of 0.1 ml methanesulfonic acid. The viscosity of the solution at 25° C. is 2200 cps. Initially Resin VI had a viscosity of 500 cps.

EXAMPLE 15

To 100 g of Resin VI (50% in styrene) were added 0.27 g potassium acetate solution, 50 mg hydroquinone and dropwise 4 ml toluenediisocyanate at 70° C. The product was heated for 80 minutes. The product had a viscosity at 25° C. of 9000 cps. The starting material had a viscosity of 975 cps/25° C.

What is claimed is:

1. A method of increasing the viscosity of a uniformly dispersed or solubilized composition comprising (A) at least 10 percent by weight of a polymerizable resin selected from the class consisting of a vinyl urethane resin and an unsaturated polyester resin which resin is curable to a thermoset resin and has a molecular weight of at least 500, and (B) up to 90% by weight of an ethylenically unsaturated monomer, which method comprises mixing into the composition an amount of at least 2% by weight of the composition of a polyisocyanate and a catalytic amount of a trimerization catalyst selected from the class consisting of quaternary ammonium hydroxides, quaternary ammonium acetates, quaternary ammonium formates, alkali metal acetates and alkali metal formates, and trimerizing the polyisocyanate in the composition.

2. A method as claimed in claim 1 wherein the polymerizable has a hydroxyl number of less than 30 and is dissolved or dispersed in up to 75% by weight of the composition.

3. A method as claimed in claim 1 wherein the polyisocyanate is added in an amount of 2 to 10% by weight of the composition.

4. A method as claimed in claim 1 wherein the composition is thickened to a viscosity of at least one million centipoise.

5. A method as claimed in claim 1 wherein the polyisocyanate is selected from the group consisting of 2,4-toluene diisocyanate, diphenyl methane diisocyanate, 2,6-toluene diisocyanate, m-phenylene diisocyanate, p-phenylene diisocyanate, 4,4'-diphenyl ether diisocyanate, diphenylmethane polyisocyanate having 2.1 to 3.0 isocyanate groups per mol.

6. A method as claimed in claim 1 wherein the monomer is a monomer selected from the group consisting of styrene, vinyltoluene, divinyl benzene, the methyl, ethyl, n-butyl, 2-ethyl hexyl or pentaerythritol esters of acrylic and methacrylic acid, triallyl isocyanurate, vinyl acetate, diallyl fumarate, vinyl ether and acrylonitrile.

7. A method as claimed in claim 1 wherein the polymerizable resin is an isocyanurate of urethanes of an aromatic polyisocyanate and at least one vinylidene carbonyl oxy alkanol characterized by one of the following formulas:

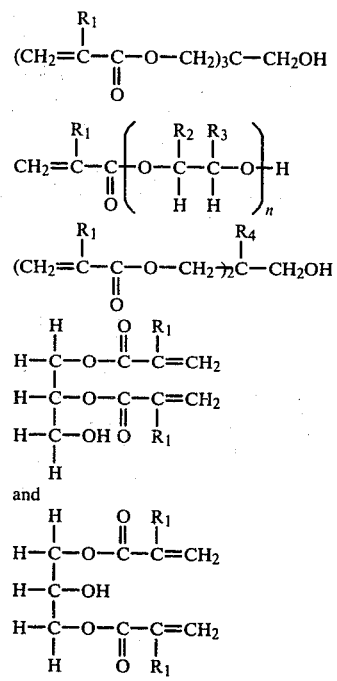

wherein $R_1$ is hydrogen or an alkyl group containing from 1 to 4 carbon atoms, $R_2$ is hydrogen, alkyl containing from 1 to 12 carbon atoms, or a chlorinated, brominated, or fluorinated alkyl group containing from 1 to 12 carbon atoms, $R_3$ is hydrogen, alkyl containing from 1 to 12 carbon atoms, or a chlorinated, brominated, or fluorinated alkyl group containing from 1 to 12 carbon atoms, $R_4$ is hydrogen, methyl or ethyl, and n is from one to four, with the proviso that $R_2$ and $R_3$ on adjacent carbon atoms are not both alkyl or chlorinated, brominated, or fluorinated alkyl, that is at least one of $R_2$ and $R_3$ must be hydrogen.

8. A method as claimed in claim 1 wherein the polymerizable resin has the following formula

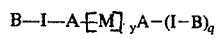

wherein

A is a radical derived from a polyoxyalkylene bisphenol A having the following formula:

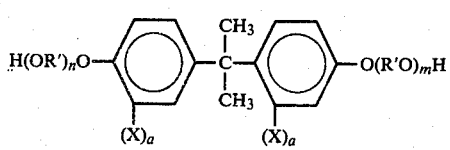

wherein

R' is $C_1$-$C_4$ alkylene group,

X is halogen or a $C_1$-$C_4$ alkyl group, a is an integer equal to from 0 to 2, and m and n are integers each of which is equal to at least 1 and the sum of which is equal to from 2.0 to about 30.0;

M is a radical derived from (A) an unsaturated, aliphatic, polycarboxylic acid or an anhydride thereof, (B) a saturated aliphatic polycarboxylic acid or an anhydride thereof, (C) an aromatic polycarboxylic acid or anhydride thereof or (D) mixture of A, B, or C;

I is a radical derived from an isocyanate having an isocyanate functionality of at least 2;

B is a radical derived from a monohydroxyl-terminated ester of unsubstituted or substituted acrylic or methacrylic acid wherein the substitutents are halogen or $C_1$-$C_4$ alkyl groups;

y is an integer equal to from 1 to about 12, and q is zero or one.

9. A polymerizable composition which comprises a product produced by the method of claim 1.

10. A composition as claimed in claim 9 which comprises a product produced by the method of claim 2.

11. A composition as claimed in claim 10 wherein the polyisocyanate is added in an amount of 4 to 10% by weight of the dispersed or solubilized composition.

12. A composition as claimed in claim 9 wherein the trimerization catalyst is N-benzyl-trimethyl ammonium hydroxide or potassium acetate.

13. A composition as claimed in claim 9 wherein the polyisocyanate is selected from the group consisting of 2,4-toluene diisocyanate, 2,6-toluene diisocyanate, m-phenylene diisocyanate, p-phenylene diisocyanate, 4,4'-diphenyl ether diisocyanate, diphenylmethane polyisocyanate, having 2.1 to 3.0 isocyanate groups per mol.

14. A composition as claimed in claim 9 wherein the monomer is a monomer selected from the group consisting of styrene, vinyltoluene, divinyl benzene, the methyl, ethyl, n-butyl, 2-ethyl hexyl or pentaerythritol esters of acrylic and methacrylic acid, triallyl isocyanurate, vinyl acetate, diallyl fumarate, vinyl ether and acrylonitrile.

15. A composition as claimed in claim 9 wherein the polymerizable resin is an isocyanurate of urethanes of an aromatic polyisocyanate and at least one vinylidene carbonyl oxy alkanol characterized by one of the following formulas:

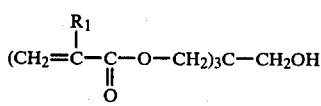

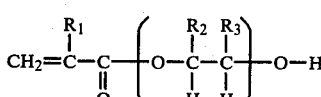

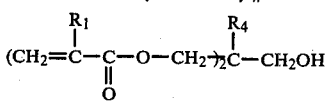

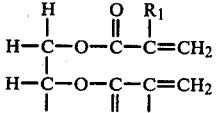

and

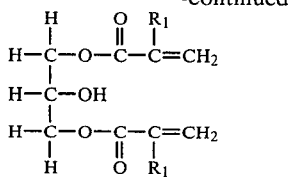

wherein $R_1$ is hydrogen or an alkyl group containing from 1 to 4 carbon atoms, $R_2$ is hydrogen, alkyl containing from 1 to 12 carbon atoms, or a chlorinated, brominated, or fluorinated alkyl group containing from 1 to 12 carbon atoms, $R_3$ is hydrogen, alkyl containing from 1 to 12 carbon atoms, or a chlorinated brominated, or fluorinated alkyl group containing from 1 to 12 carbon atoms, $R_4$ is hydrogen, methyl or ethyl, and n is from one to four, with the proviso that $R_2$ and $R_3$ on adjacent carbon atoms are not both alkyl or chlorinated, brominated, or fluorinated alkyl, that is at least one of $R_2$ and $R_3$ must be hydrogen.

16. A composition as claimed in claim 9 wherein the polymerizable resin has the following formula:

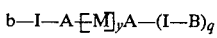

wherein

A is a radical derived from a polyoxyalkylene bisphenol A having the following formula:

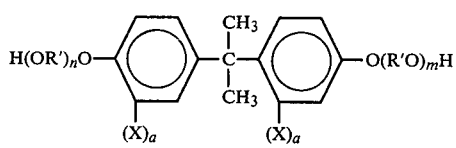

wherein

R' is $C_1$-$C_4$ alkylene group,

X is halogen or a $C_1$-$C_4$ alkyl group, a is an integer equal to from 0 to 2, and m and n are integers each of which is equal to at least 1 and the sum of which is equal to from 2.0 to about 30.0;

M is a radical derived from (A) an unsaturated, aliphatic, polycarboxylic acid or an anhydride thereof, (B) a saturated aliphatic polycarboxylic acid or an anhydride thereof, (C) an aromatic polycarboxylic acid or anhydride thereof or (D) mixtures of A, B, or C;

I is a radical derived from an isocyanate having an isocyanate functionality of at least 2;

B is a radical derived from a monohydroxyl-terminated ester of unsubstituted or substituted acrylic or methacrylic acid wherein the substituents are halogen or $C_1$-$C_4$ alkyl groups;

y is an integer equal to from 1 to about 12, and q is zero or one.

17. A composition as claimed in claim 9 which is a sheet molding composition having a viscosity of more than one million centipoise.

18. A sheet molding composition as claimed in claim 17 which additionally comprises a reinforcing glass fiber filler.

19. A composition as claimed in claim 18 which additionally comprises a free radical polymerization catalyst.

20. A composition as claimed in claim 18 wherein said reinforcing filler is selected from the group consisting of glass fibers, graphite fibers, asbestos fibers, fibers derived from organic polymers, ranging in size from one to 10 cms. long.

21. A fully cured sheet molded composition made by the process of shaping a composition as claimed in claim 20 and thereafter copolymerizing the ethylenically unsaturated monomer with said thermoset resin by free-radical activation.

22. A resin blend useful in preparing nontacky molding compositions by the reaction therewith of polyisocyanates which comprises:

(1) At least 10% by weight of the blend of the polymerizable resin selected from the class consisting of a vinyl urethane resin and a unsaturated polyester resin, which polymerizable resins has a molecular weight of at least 500 and which is curable to a thermoset resin.

(2) Up to 90% by weight of the blend, of a ethylenically unsaturated monomer.

(3) From 0.002 to 1% by weight of the blend of a polyisocyanate trimerization catalyst selected from the class consisting of quaternary ammonium hydroxide, quaternary ammonium acetates, quaternary ammonium formates, alkali metal acetates and alkali metal formates.

23. A blend as claimed in claim 22 wherein the trimerization catalyst is present in an amount of 0.02 to 0.4 by weight of the blend.

24. A blend as claimed in claim 22 wherein the monomer is selected from the group consisting of styrene, vinyltoluene, divinyl benzene, the methyl, ethyl, n-butyl, 2-ethyl hexyl or pentaerythritol esters of acrylic and methacrylic acid, triallyl isocyanurate, vinyl acetate, diallyl fumarate, vinyl ether and acrylonitrile.

25. A blend as claimed in claim 22 wherein the polymerizable resin is an isocyanurate of urethanes of an aromatic polyisocyanate and at least one vinylidene carbonyl oxy alkanol characterized by one of the following formulas:

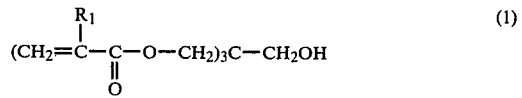

(1)

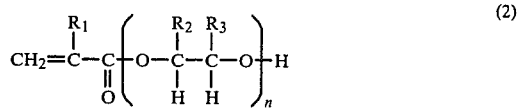

(2)

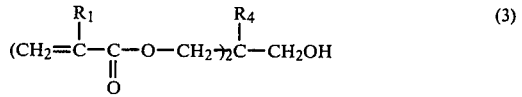

(3)

(4)

and

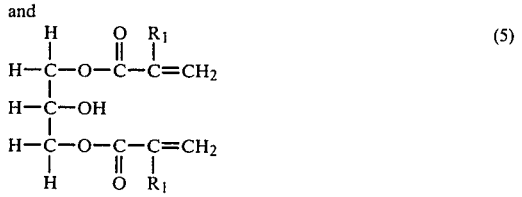

(5)

wherein $R_1$ is hydrogen or an alkyl group containing from 1 to 4 carbon atoms, $R_2$ is hydrogen, alkyl containing from 1 to 12 carbon atoms, or a chlorinated, brominated, or fluorinated alkyl group containing from 1 to 12 carbon atoms, $R_3$ is hydrogen, alkyl containing from 1 to 12 carbon atoms, or a chlorinated, brominated, or fluorinated alkyl group containing from 1 to 12 carbon atoms, $R_4$ is hydrogen, methyl or ethyl, and n is from one to four, with the proviso that $R_2$ and $R_3$ on adjacent carbon atoms are not both alkyl or chlorinated, brominated, or fluorinated alkyl, that is at least one of $R_2$ and $R_3$ must be hydrogen.

26. A blend as claimed in claim 22 wherein the polymerizable resin has the following formula $$B-I-[A-M]_y-A-(I-B)_q$$

wherein

A is a radical derived from a polyoxyalkylene bisphenol A having the following formula:

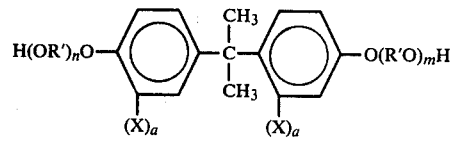

wherein
R' is $C_1$–$C_4$ alkylene group,
X is halogen or a $C_1$–$C_4$ alkyl group,
a is an integer equal to from 0 to 2, and
m and n are integers each of which is equal to at least 1 and the sum of which is equal to from 2.0 to about 30.0;
M is a radical derived from (A) an unsaturated, aliphatic, polycarboxylic acid or an anhydride thereof, (B) a saturated aliphatic polycarboxylic acid or an anhydride thereof, (C) an aromatic polycarboxylic acid or anhydride thereof or (D) mixtures of A, B, or C;
I is a radical derived from an isocyanate having an isocyanate functionality of at least 2;
B is a radical derived from a monohydroxy-terminated ester of unsubstituted or substituted acrylic or methacrylic acid wherein the substituents are halogen or $C_1$–$C_4$ alkyl groups;
y is an integer equal to from 1 to about 12, and
q is zero or one.

27. A blend as claimed in claim 22 wherein the trimerization catalyst is N-benzyl-trimethyl ammonium hydroxide or potassium acetate.

28. A blend as claimed in claim 22 which additionally comprises a free radical polymerization catalyst.

* * * * *

UNITED STATES PATENT AND TRADEMARK OFFICE
CERTIFICATE OF CORRECTION

PATENT NO.    : 4,296,215
DATED         : October 20, 1981
INVENTOR(S)   : Kenneth H. Markiewitz It is certified that error appears in the above-identified patent and that said Letters Patent are hereby corrected as shown below:

Column 15, line 40, "MgOH" should read --MeOH--.

Column 23, line 24, "b-I-A$[M]_y$A-(I-B)$_q$ should read --B-I-A$[M]_y$A-(I-B)$_q$--.

Column 20, line 47, after the syllable "merizable" insert the word "resin".

Column 19, line 14, "styrene" should read --styrene)--.

Column 19, line 59, "Resin II" should read --Resin III---.

Column 19, line 60, both instances, "Ex. 14" should read --Ex. 12--.

Column 20, line 6, "Resin II" should read --Resin III--.

Column 20, line 7, both instances, "Ex. 14" should read --Ex. 12--.

Column 20, line 19, "Resin VI" should read --Resin V--.

Signed and Sealed this

Fifteenth Day of June 1982

[SEAL]

*Attest:*

*Attesting Officer*

GERALD J. MOSSINGHOFF
*Commissioner of Patents and Trademarks*